Figure 1:
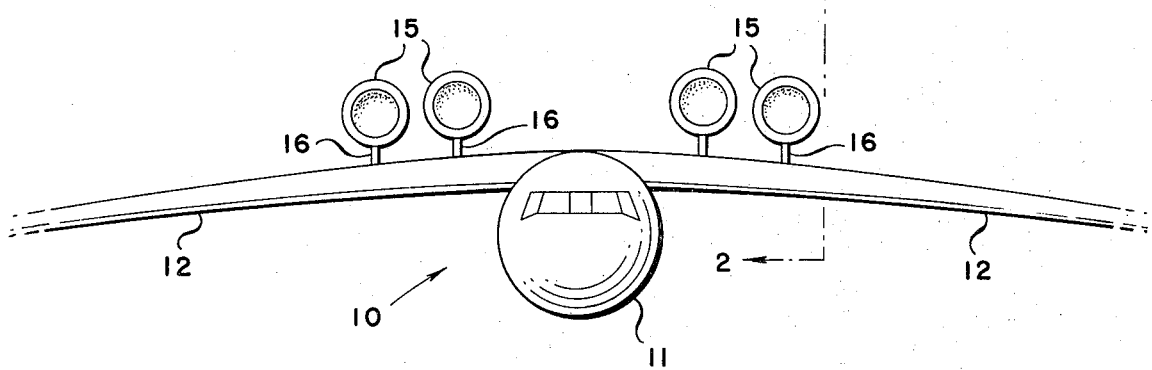

United States Patent [19]
Leslie et al.

[11] 3,829,044
[45] Aug. 13, 1974

[54] ENGINE ARRANGEMENT FOR HIGH PERFORMANCE STOL AIRCRAFT

[75] Inventors: Henry R. Leslie, Atlanta; Roger J. Samways, Marietta, both of Ga.

[73] Assignee: Lockheed Aircraft Corporation, Burbank, Calif.

[22] Filed: Mar. 23, 1973

[21] Appl. No.: 344,240

[52] U.S. Cl............................ 244/13, 244/42 CC
[51] Int. Cl. ........................................... B64c 3/38
[58] Field of Search............ 244/12 R, 12 D, 13, 15, 244/42 C, 42 CC, 42 CF, 42 R, 23 R, 23 D, 40 R, 130; 239/265.23, 265.25; 60/222

[56] References Cited
UNITED STATES PATENTS

| | | | |
|---|---|---|---|
| 3,018,983 | 1/1962 | Davidson | 244/52 |
| 3,164,337 | 1/1965 | Hooper | 244/74 |
| 3,286,930 | 11/1966 | Petrie | 239/265.21 |
| 3,599,900 | 8/1971 | Szlenkier | 244/12 |

FOREIGN PATENTS OR APPLICATIONS

| | | | |
|---|---|---|---|
| 768,044 | 5/1955 | Germany | 244/15 |
| 1,272,553 | 8/1960 | France | 244/12 R |

Primary Examiner—Duane A. Reger
Assistant Examiner—Jesus D. Sotelo
Attorney, Agent, or Firm—Billy G. Corber; John J. Sullivan

[57] ABSTRACT

A form of power augmented high lift for aircraft mounts engine nacelles on overwing pylons. The nozzle system is a vectoring device such that the engine exhaust flow is caused to impinge on the upper surface of the flap at any flap angle. The vector device may be any of several types, such as the swivel nozzle illustrated, and is linked to the flap system to ensure optimum impingement angle on the surface providing flow attachment and a jet sheet extension to the trailing edge. In cruise the nozzle system directs the exhaust aft so that no flow interference with the wing/flap surface occurs.

5 Claims, 3 Drawing Figures

PATENTED AUG 13 1974          3,829,044

ENGINE ARRANGEMENT FOR HIGH PERFORMANCE STOL AIRCRAFT

This invention relates generally to externally mounted engines for aircraft and more particularly to a specific arrangement and location of such engines for short take-off and landing (STOL) aircraft whereby the engines combine with associated aircraft components to enhance the performance of the aircraft both in the high lift and cruise regimes.

Thrust vectoring of aircraft engine exhaust has been utilized successfully to provide the magnitude and direction of power required for high performance STOL aircraft. Thus, for take-off and landing operations the exhaust outlet of the aircraft engine or engines is rotated or the exhaust otherwise deflected vertically resulting in an opposite direction reaction on the aircraft. During level flight or cruise, such outlet or outlets are located in the horizontal position, i.e., with the centerline substantially fore and aft relative to the aircraft for forward propulsion.

At the same time, additional means has been employed in order to obtain supplemental lift during the take-off and landing modes. Typically boundary layer air, i.e., the air passing over the surface of the wing is forced to adhere to the upper wing surface by an addition thereto of high pressure air forming in effect a spanwise sheet of air. This pressurized air is obtained from the engine or engines, being ducted or otherwise directed internally of the wing and discharged at the wing surface in a generally aft direction.

Also, the so-called "blown flap" has been employed with considerable success. In this case, the pressurized air is discharged at the upper wing surface adjacent the hinge line of the wing flap when the flap is disposed in the fully down position. Alternatively (and sometimes concurrently) pressurized air is ducted through the flap and discharged at the aft end thereof. In other words, either or both an internally and externally blown flap has been used.

Since, as indicated above, the upper wing surface is the critical surface for airflow in order to produce maximum lift, it has been usually preserved aerodynamically clean, i.e., without obstruction. For this reason, the engines when wing mounted have usually been carried under the wing. In some cases they have been removed from the wing entirely and mounted on the fuselage or over the wing in spaced relation to the upper surface where the exhaust or discharge is directed over the upper wing surface to augment airflow. Lift is thereby enhanced since a greater mass of air leaves the wing trailing edge and at a greater velocity.

The present invention proposes to build on the foregoing state of the art offering improvements to high performance STOL aircraft. To this end, it is proposed to mount each engine externally of the aircraft above and in spaced relation to the upper wing surface with its center of gravity located at approximately the middle of the wing chord. Thus disposed, the engine exhaust outlet is positioned adjacent the hinge line of the flap and adapted to be vectored for discharge substantially parallel to the upper flap surface at every position in its angular adjustment.

In addition to maintaining the wing surfaces aerodynamically clean the arrangement herein contemplated has the advantage of eliminating the requirement for any boundary layer control at the knee of the flap in order to assure an attached airflow, i.e., the so-called "Coanda" turning. Also, this arrangement permits the location of the engines further inboard than otherwise possible making the aircraft more stable in the event of an engine out condition. Moreover, location of the engine above the wing with its outlet or nozzle spaced from the wing surface can result in improved cruise characteristics by providing a negative pressure force accelerating the wing boundary layer air. At the same time, the hazard of foreign object ingestion at the engine inlet opening, a major problem with STOL aircraft, is virtually eliminated.

Figure 2:
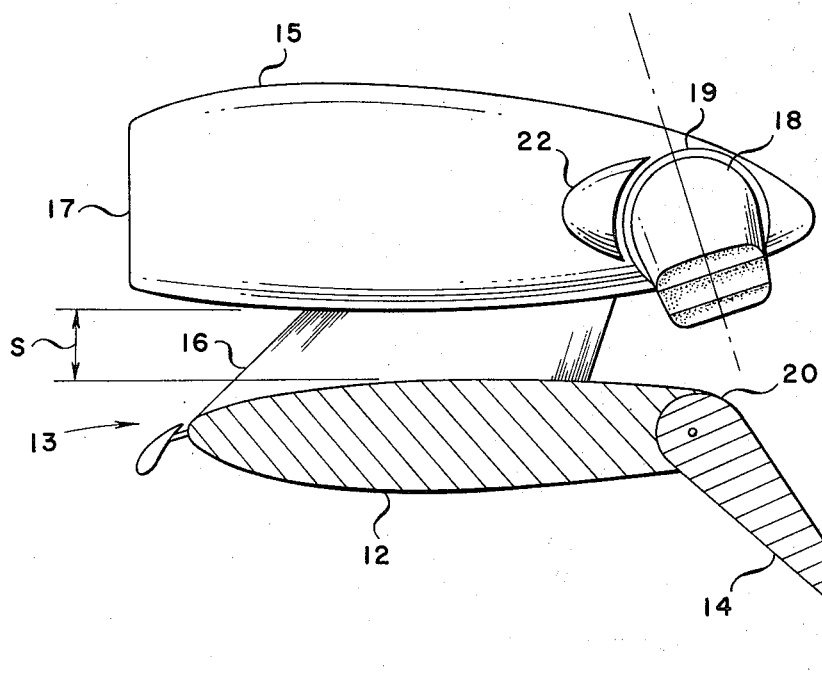
Figure 3:
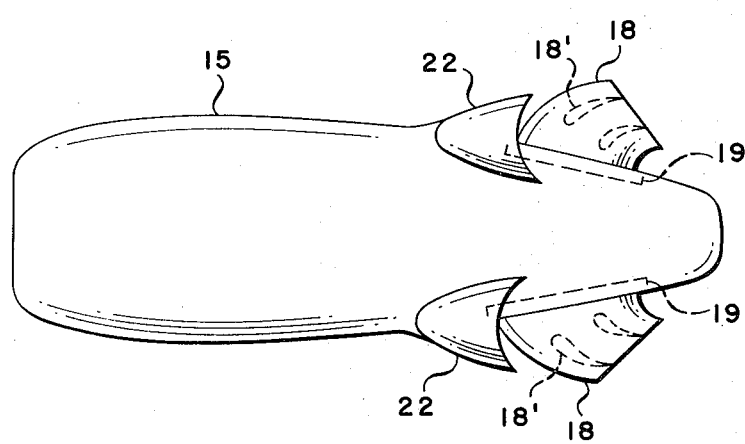

With the above and other objects in view as will be apparent, this invention consists in the construction, combination, and arrangement of parts all as hereinafter more fully described, claimed and illustrated in the accompanying drawings wherein:

FIG. 1 is a front elevation of an airplane modified to include an engine arrangement in accordance with the teachings of this invention to show primarily the relative location of multiple engines, when employed, to each other and to the other major components of the airplane;

FIG. 2 is a section taken along the line 2—2 of FIG. 1 to show primarily the relative location of each engine and the associated wing including its flap, the position of the flap being shown deflected corresponding to the high lift landing mode of the airplane; and FIG. 3 is a plan view of the engine only of FIG. 2 to show primarily the arrangement of the exhaust outlets adjacent the aft end thereof and disposed in the aft direction corresponding to the level flight or cruise mode of the airplane.

Referring more particularly to the drawings, 10 designates a typical airplane comprised of a fuselage 11 and a fixed wing 12 extending from each side thereof. Each wing 12 includes a leading edge 13 usually movable in STOL aircraft and a hinged flap 14 at and along its trailing edge.

Associated with the above conventional airplane components is a plurality of engines preferably turbofans each housed within a nacelle 15. While these nacelles 15 may be carried by a fuselage 11, in the high wing airplane illustrated they are each mounted on an upstanding pylon 16 carried by the adjacent wing 12. In any event each engine nacelle 15 is located in a stationary position with its center of gravity near the middle of the wing chord length. Thus disposed each nacelle 15 is located in spaced relation indicated S (FIG. 2) to the upper wing surface with the inlet opening 17 to the engine within the nacelle 15 terminating in a predetermined position relative to the leading edge of the wing 12 dictated by such factors as the amount of spacing, wing camber, etc.

Adjacent its aft end, each engine nacelle 15 is provided with an outlet which is angularly adjustable. Preferably this is accomplished by means of and through swivel nozzles 18 (including internal turning vanes 18') rotatably mounted in any conventional manner such as in bearings 19 for as much as 360° rotation, if desired, on each side of the associated nacelle 15, although any thrust vectoring scheme could be used. The important fact is that the location of the nozzles 18 is such that when the adjacent flap 14 is in its fully deflected position corresponding to the high lift mode (FIG. 2) they can be rotated to discharge at and along the full upper flap surface, i.e., from a point at or preferably just ahead of the knee 20 of the trailing edge 21. In this position, the extremity of each nozzle 18 is spaced from the upper wing surface as clearly shown in FIG. 2.

When the airplane 10 is in the cruise or level flight mode the nozzles 18 are rotated to direct their exhaust aft, i.e., in a plane essentially parallel to the line of flight. At this time the nozzle extremities are so spaced from the upper wing surface that a negative pressure or suction is created along the upper wing surface to accelerate airflow thereover. If desired or required, a fairing 22 may be employed upstream of each nozzle 18 to aerodynamically hide the engine from the slipstream and thereby minimize its affect on drag in the cruise mode of the airplane.

It is noteworthy that the proposed arrangement lends itself well to reverse thrust operation after airplane touchdown. At this time, the nozzles 18 are rotated counterclockwise (FIG. 2) to a point where their exhaust is directed generally forward. In this position they are fully effective as thrust reversers while at the same time not interfering with the drag function of the deflected flaps 14; nor do they induce ingestion of ground debris by the engine within the nacelle 15 through its inlet 17.

Also, as best illustrated in FIG. 1, it is possible to place each engine 15 farther inboard than otherwise possible. This facilitates engine mounting to the wing when desired and the structural integrity of the engine assembly. It also facilitates the ducting internally of the airplane where engine air is to be supplied for various uses and secondary functions of the airplane during its operation. At the same time better airplane stability results in the event of an engine out condition.

The foregoing arrangment constitutes a preferred embodiment of the invention. Basic airplane design may dictate alternate structure also contemplated herein and encompassed by the appended claims.

What is claimed is:

1. The combination with an aircraft having a fuselage, a fixed wing extending from each side of said fuselage and a hinged flap at and along the aft end of each said wing, of at least one engine disposed on each side of said fuselage above and in spaced relation to the associated wing, and at least one rotatable exhaust nozzle from each engine, each said nozzle having an exhaust outlet located above the wing surface adjacent the hinge line of the associated flap whereby the longitudinal centerline of each said nozzle may be disposed generally parallel to the upper surface of the associated flap at all times and the exhaust discharge restricted to impingement on and against said hinge line and said upper flap surface of each flap when the flap is fully deflected.

2. The combination of claim 1 including a pylon carried by and extending upwardly from each wing adapted to mount each said engine.

3. The combination of claim 2 wherein the center of gravity of each engine is located substantially at the middle of the wing chord.

4. The combination of claim 1 wherein one of said exhaust nozzles is rotatably mounted on each side of said engine.

5. The combination of claim 4 including a fairing associated with each said nozzle on the upstream side thereof in the level flight mode of the aircraft.

* * * * *